(12) United States Patent
Chu

(10) Patent No.: US 10,748,348 B2
(45) Date of Patent: Aug. 18, 2020

(54) METHOD, APPARATUS AND ELECTRONIC DEVICE FOR DISPLAYING AN IMAGE AND STORAGE MEDIUM

(71) Applicant: Beijing Kingsoft Internet Security Software Co., Ltd., Beijing (CN)

(72) Inventor: Ming Yan Jonathan Chu, Beijing (CN)

(73) Assignee: Beijing Kingsoft Internet Security Software Co., Ltd., Beijing (CN)

( * ) Notice: Subject to any disclaimer, the term of this patent is extended or adjusted under 35 U.S.C. 154(b) by 0 days.

(21) Appl. No.: 16/108,958

(22) Filed: Aug. 22, 2018

(65) Prior Publication Data

US 2019/0096139 A1   Mar. 28, 2019

(30) Foreign Application Priority Data

Sep. 28, 2017   (CN) .......................... 2017 1 0900094

(51) Int. Cl.
*G06T 19/20* (2011.01)
*G06F 3/0484* (2013.01)
(Continued)

(52) U.S. Cl.
CPC .......... *G06T 19/20* (2013.01); *G06F 3/04845* (2013.01); *G06T 3/005* (2013.01);
(Continued)

(58) Field of Classification Search
CPC ..... G06T 15/205; G06T 3/0062; G06T 17/05; G06T 3/4038; G06T 3/005; H04N 5/23238; G03B 37/00
See application file for complete search history.

(56) References Cited

U.S. PATENT DOCUMENTS

2012/0200665 A1* 8/2012 Furumura ............. G06T 3/0062
                                                          348/36
2014/0015794 A1* 1/2014 Ueno ................... G06F 3/04883
                                                          345/174
(Continued)

FOREIGN PATENT DOCUMENTS

CN           104331241 A        2/2015
CN           105242826 A        1/2016
(Continued)

*Primary Examiner* — Haixia Du
(74) *Attorney, Agent, or Firm* — Boyle Fredrickson S.C.

(57) ABSTRACT

Embodiments of the present application provide a method, apparatus, electronic device for displaying an image and a storage medium. The method and apparatus are applied to an electronic device. The method comprises: determining a display angle of a 3D wallpaper containing elements, wherein the 3D wallpaper is obtained by pasting an overall spherical panoramic image containing all the elements onto one 3D model; determining a graphic to be displayed corresponding to the display angle in the overall spherical panoramic image; and rendering the graphic to be displayed and displaying the rendered graphic. In the embodiments, when the graphic to be displayed corresponding to the display angle of the 3D wallpaper is rendered, the operation on unnecessary occluded parts is avoided, thereby reducing the amount of computation in displaying the 3D wallpaper and saving the computing resources.

17 Claims, 2 Drawing Sheets

(51) Int. Cl.
*G06T 15/00* (2011.01)
*G06T 3/00* (2006.01)

(52) U.S. Cl.
CPC .......... *G06T 3/0087* (2013.01); *G06T 15/005* (2013.01); *G06T 2219/016* (2013.01)

(56) References Cited

U.S. PATENT DOCUMENTS

| | | |
|---|---|---|
| 2015/0279001 A1 | 10/2015 | Li et al. |
| 2016/0073023 A1* | 3/2016 | Rondinelli ......... H04N 5/23238 348/36 |
| 2017/0171592 A1* | 6/2017 | Cui ..................... H04N 21/816 |

FOREIGN PATENT DOCUMENTS

| | | |
|---|---|---|
| CN | 105892890 A | 8/2016 |
| CN | 106030523 A | 10/2016 |

\* cited by examiner

METHOD, APPARATUS AND ELECTRONIC DEVICE FOR DISPLAYING AN IMAGE AND STORAGE MEDIUM

CROSS REFERENCE TO RELATED APPLICATION

The present application claims the priority to a Chinese patent application No. 201710900094.1, filed with the State Intellectual Property Office of People's Republic of China on Sep. 28, 2017 and entitled "Method, Apparatus and Electronic Device for Displaying an Image and Storage Medium", which is hereby incorporated into the present application by reference in its entirety.

TECHNICAL FIELD

The present application relates to the field of image display technology, and in particular to a method, apparatus and electronic device for displaying an image, and a storage medium.

BACKGROUND

Currently, the process of producing a 3D wallpaper containing elements includes: creating a 3D model for each element, making a map for the element on the surface of the 3D model, and stitching all the 3D models for the elements to obtain the 3D wallpaper. For example, if a wallpaper includes three elements of sky, sea and island, it is required in the prior art to create a 3D model for each of the three elements respectively, make a map for each element on the surface of the corresponding 3D model, and stitch the three 3D models together. In this way, the production of the 3D wallpaper is achieved.

SUMMARY

When an electronic device renders a graphic corresponding to a certain display angle of the 3D wallpaper, there are occluded parts between the elements in the 3D wallpaper, and these occluded parts should be invisible to the user. In the prior art, it is necessary to perform operations on these occluded parts between the elements such that these occluded parts are invisible to the user, thus achieving a 3D effect. If the wallpaper includes many elements, there will be a larger number of occluded parts, which increases the amount of computation of the electronic device and wastes computing resources for computing the occluded parts.

To this end, an embodiment of the present application aims to provide a method, apparatus and electronic device for displaying an image and a storage medium, which can solve the problem of how to reduce the amount of computation in displaying the 3D wallpaper.

To achieve the above object, an embodiment of the present application provides a method for displaying an image, which is applied to an electronic device. The method includes:

determining a display angle of a 3D wallpaper containing elements, wherein the 3D wallpaper is obtained by pasting an overall spherical panoramic image containing all the elements onto one 3D model;

determining a graphic to be displayed corresponding to the display angle in the overall spherical panoramic image; and rendering the graphic to be displayed and displaying the rendered graphic.

In a specific implementation provided in the embodiment of the present application, the 3D model is a 3D sphere model or a skybox.

In the specific implementation provided in the embodiment of the present application, when the 3D model is the 3D sphere model, before determining a display angle of a 3D wallpaper containing elements, the method further includes:

converting the overall spherical panoramic image into a 3D sphere map; and pasting the 3D sphere map onto one 3D sphere model to obtain the 3D wallpaper.

In the specific implementation provided in the embodiment of the present application, when the 3D model is the skybox, before determining a display angle of a 3D wallpaper containing elements, the method further includes:

converting the overall spherical panoramic image into a cuboid map; and pasting the cuboid map onto one skybox to obtain the 3D wallpaper.

In a specific implementation provided in the embodiment of the present application, a display screen is provided on the electronic device, and determining a display angle of a 3D wallpaper containing elements includes:

acquiring a first gesture operation of a user on the display screen;

determining a solid angle of rotation of the 3D model corresponding to the first gesture operation; and determining a solid angle after rotation as the display angle of the 3D wallpaper.

In a specific implementation provided in the embodiment of the present application, the first gesture operation is a slide operation; and determining a solid angle of rotation of the 3D model corresponding to the first gesture operation includes:

acquiring a first slide trajectory of the slide operation; and determining a solid angle of rotation of the 3D model corresponding to the first slide trajectory according to a preset correspondence between a slide trajectory and a solid angle of rotation of the 3D model.

In a specific implementation provided in the embodiment of the present application, a display screen is provided on the electronic device; and after displaying the graphic to be displayed, the method further includes:

acquiring a second gesture operation of a user on a display area of the display screen; and zooming in a display graphic in the display area.

In a specific implementation provided in the embodiment of the present application, a gyroscope is provided on the electronic device; and determining a display angle of a 3D wallpaper containing elements includes:

acquiring rotation coordinates of the gyroscope;

computing a solid angle of rotation of the 3D model corresponding to the rotation coordinates; and determining a solid angle after rotation as the display angle of the 3D wallpaper.

In a specific implementation provided in the embodiment of the present application, a gyroscope is provided on the electronic device; and determining a display angle of a 3D wallpaper containing elements includes:

determining a preset display angle as the display angle of the 3D wallpaper when it is detected that the gyroscope does not rotate for a first preset duration.

An embodiment of the present application further provides an apparatus for displaying an image, which is applied to an electronic device. The apparatus includes:

a first determining module configured to determine a display angle of a 3D wallpaper containing elements, wherein the 3D wallpaper is obtained by pasting an overall spherical panoramic image containing all the elements onto one 3D model;

a second determining module configured to determine a graphic to be displayed corresponding to the display angle in the overall spherical panoramic image; and a first display module configured to render the graphic to be displayed and display the rendered graphic.

In a specific implementation provided in the embodiment of the present application, the 3D model is a 3D sphere model or a skybox.

In a specific implementation provided in the embodiment of the present application, when the 3D model is the 3D sphere model, the apparatus further includes:

a first conversion module configured to convert the overall spherical panoramic image into a 3D sphere map; and a first pasting module configured to paste the 3D sphere map onto one 3D sphere model to obtain the 3D wallpaper.

In a specific implementation provided in the embodiment of the present application, when the 3D model is the skybox, the apparatus further includes:

a second conversion module configured to convert the overall spherical panoramic image into a cuboid map; and a second pasting module configured to paste the cuboid map onto one skybox to obtain the 3D wallpaper.

In a specific implementation provided in the embodiment of the present application, a display screen is provided on the electronic device; and the first determining module includes:

a first acquisition unit configured to acquire a first gesture operation of a user on the display screen;

a first determining unit configured to determine a solid angle of rotation of the 3D model corresponding to the first gesture operation; and a second determining unit configured to determine a solid angle after rotation as the display angle of the 3D wallpaper.

In a specific implementation provided in the embodiment of the present application, the first gesture operation is a slide operation; and the first determining unit is configured to acquire a first slide trajectory of the slide operation, and determine a solid angle of rotation of the 3D model corresponding to the first slide trajectory according to a preset correspondence between a slide trajectory and a solid angle of rotation of the 3D model.

In a specific implementation provided in the embodiment of the present application, a display screen is provided on the electronic device; and the apparatus further includes:

an acquiring module configured to acquire a second gesture operation of a user on a display area of the display screen; and a second display module configured to zoom in a display graphic in the display area.

In a specific implementation provided in the embodiment of the present application, a gyroscope is provided on the electronic device; and the first determining module includes:

a second acquiring unit configured to acquire rotation coordinates of the gyroscope; and a computing unit configured to compute a solid angle of rotation of the 3D model corresponding to the rotation coordinates; and a third determining unit configured to determine a solid angle after rotation as the display angle of the 3D wallpaper.

In a specific implementation provided in the embodiment of the present application, a gyroscope is provided on the electronic device; and the first determining module is configured to determine a preset display angle as the display angle of the 3D wallpaper when detecting that the gyroscope does not rotate for a first preset duration.

An embodiment of the present application further provides an electronic device including a processor, a communication interface, a memory and a communication bus; wherein, the processor, the communication interface, and the memory communicate with each other via the communication bus;

the memory is used to store a computer program;

the processor is used to implement the above method when executing the program stored in the memory.

In a specific implementation provided in the embodiment of the present application, a display screen is provided on the electronic device; and the processor is used to implement the above method when executing the program stored in the memory.

In a specific implementation provided in the embodiment of the present application, a gyroscope is provided on the electronic device; and the processor is used to implement the above method when executing the program stored in the memory.

An embodiment of the present application further provides a computer readable storage medium. The computer readable storage medium stores a computer program therein. The computer program, when being executed by a processor, causes the processor to implement the above method.

An embodiment of the present application further provides a computer program product. The computer program product, when being run on a computer, causes the computer to execute the above method.

For the method, apparatus, electronic device for displaying an image and the storage medium provided in embodiments of the present application, in the process of producing a 3D wallpaper containing elements, the 3D wallpaper is obtained by pasting an overall spherical panoramic image containing all the elements onto one 3D model. Since the overall spherical panoramic image is an overall spherical panoramic image of all the elements, and the overall spherical panoramic image is pasted on one 3D model, there are not occluded parts between the elements in the 3D wallpaper. Therefore, when the graphic to be displayed corresponding to the display angle of the 3D wallpaper is rendered, the operation on these unnecessary occluded parts is avoided, thereby reducing the amount of computation in displaying the 3D wallpaper and saving the computing resources.

BRIEF DESCRIPTION OF THE DRAWINGS

To describe the solutions of embodiments of the application or the prior art more clearly, the accompanying drawings to be used in the description of embodiments or the prior art will are described briefly below. Obviously, the accompanying drawings described below are merely some embodiments of the application. Those skilled in the art can obtain other drawings based on these accompanying drawings without creative efforts.

DETAILED DESCRIPTION

The technical solutions in the embodiments of the application will be described clearly and completely below in combination with the accompanying drawings of the embodiments of the application. Obviously, the embodiments described are merely a part of the embodiments of the present application, not all of the embodiments. All other embodiments obtained by those skilled in the art based on the embodiments of the present application without creative efforts shall fall within the protection scope of the application.

To achieve the above objects, an embodiment of the present application provides a method for displaying an image. The method can be applied to an electronic device. The electronic device can be a smartphone, a tablet computer, an intelligent robot, a server, a computer, and so on.

Figure 1:
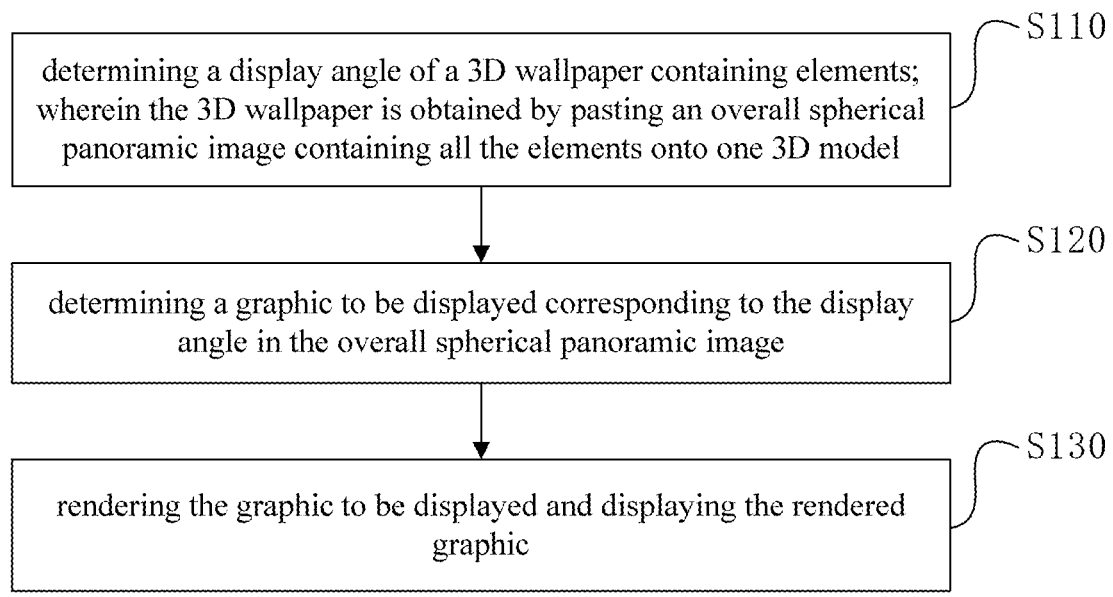
FIG. 1 is a flow chart of a method for displaying an image provided by an embodiment of the present application.

FIG. 1 is a flow chart of a method for displaying an image provided by an embodiment of the present application. The method includes steps S110 to S130.

S110, determining a display angle of a 3D wallpaper containing elements, wherein the 3D wallpaper is obtained by pasting the overall spherical panoramic image of all the elements onto one 3D model.

In this embodiment, the overall spherical panoramic image refers to an overall spherical panoramic image containing all the elements in the wallpaper. For example, when a wallpaper contains three elements: sky, sea and island, the overall spherical panoramic image is an overall spherical panoramic image that contains the three elements: sky, sea and island.

The overall spherical panoramic image can be a picture, which contains all the elements, produced by a 3D wallpaper maker. During this production, graphics of elements in the picture are continuous and there is no occluded part between them. The overall spherical panoramic image can also be a sphere panoramic picture, which contains all the elements, taken by a photographer. The picture taken by the photographer must be continuous, thus there is no occluded part between the elements in the picture.

The display angle refers to a solid angle between a graphic to be displayed and an initial display graphic in the 3D wallpaper. The initial display graphic is a preset graphic.

Figure 2:
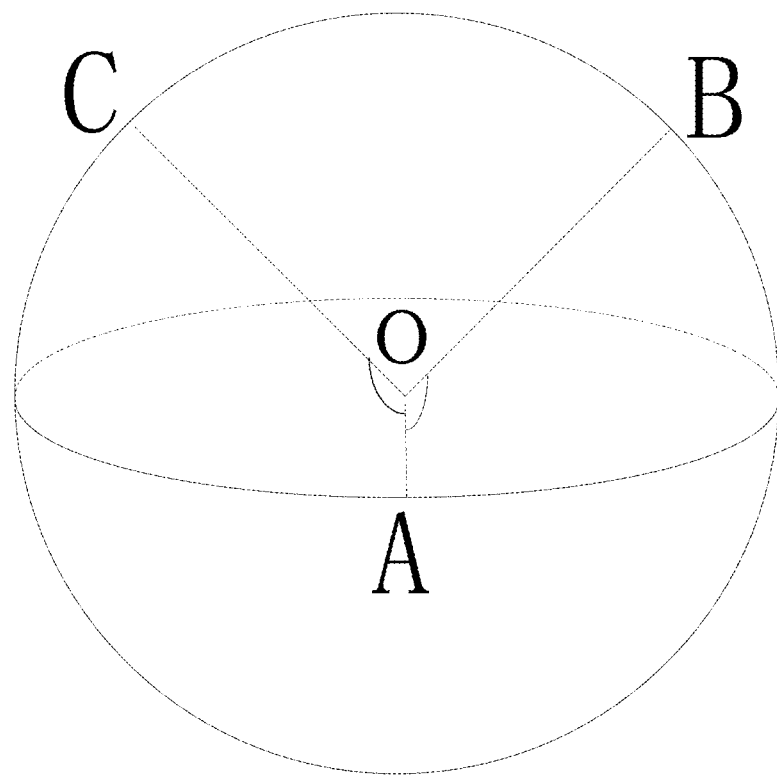
FIG. 2 is a schematic diagram of the display angle of a 3D sphere model.

The 3D model can be a skybox or a 3D sphere model. The 3D sphere model is taken as an example. FIG. 2 is a schematic diagram of the display angle in the 3D sphere model. The graphic at A can be preset as the initial display graphic. When the electronic device displays the graphic at B, ∠AOB is the corresponding display angle at B. In the present embodiment, the display angle is a three-dimensional solid angle. When the electronic device displays the graphic at C, ∠AOC is the corresponding display angle at C. Even if the ∠AOB is equal to the ∠AOC, the ∠AOB and ∠AOC are different two display angles.

In producing the 3D wallpaper in advance, the overall spherical panoramic image is pasted onto the 3D model to obtain the 3D wallpaper, such that there are not occluded parts between the elements in the obtained 3D wallpaper at different display angles.

In the present embodiment, after the electronic device enables the 3D wallpaper display function, the electronic device may determine a preset display angle, and display the display graphic on the 3D wallpaper corresponding to the display angle. Embodiments of the present application further provide other specific implementations for determining the display angle of the 3D wallpaper, and the reference can be made to the subsequent embodiments.

S120, determining a graphic to be displayed corresponding to the display angle in the overall spherical panoramic image.

S130, rendering the graphic to be displayed and displaying the rendered graphic.

Specifically, after determining the display angle of the 3D wallpaper, the electronic device can determine the graphic to be displayed corresponding to the display angle in the overall spherical panoramic image according to an existing way, render the graphic to be displayed, and display the rendered graphic. In this way, the process of displaying the 3D wallpaper is achieved.

The case that the elements in 3D Wallpaper are two mountains is taken as an example. In the prior art, during the producing of a 3D wallpaper, it is necessary to create a 3D model for each mountain, and paste the image of each mountain onto each 3D model. In rendering, since there is an overlapping part between the two mountains, it is necessary to process the overlapping part such that the processed overlap cannot be seen by the user, thereby realizing the 3D effect.

However, in the present application, during the producing of a 3D wallpaper, it is necessary to paste an overall spherical panoramic image containing the two mountains onto a 3D model to obtain the 3D wallpaper. The overall spherical panoramic image is an image obtained by shooting the two mountains. In the overall spherical panoramic image, there is no overlapping part between the two mountains. Thus it is not necessary to process the overlapping part between the two mountains in rendering, thereby reducing the amount of computation in the process of displaying the 3D wallpaper and saving the computing resources.

For the method for displaying an image provided in the embodiment of the present application, in the process of producing a 3D wallpaper containing elements, the 3D wallpaper is obtained by pasting the overall spherical panoramic image containing these elements onto a 3D model. Since the overall spherical panoramic image is an overall spherical panoramic image of all the elements, and the overall spherical panoramic image is pasted on one 3D model, there are not occluded parts between the elements in the 3D wallpaper. Therefore, when the graphic to be displayed corresponding to the display angle of the 3D wallpaper is rendered, the operation on these unnecessary occluded parts is avoided, thereby reducing the amount of computation in displaying the 3D wallpaper and saving the computing resources.

In addition, since the embodiment of the present application reduces the amount of computation in the process of rendering the graphic to be displayed and reduces the requirement for the performance of the electronic device, the method for displaying a 3D wallpaper provided by the embodiment of the present application can be more easily run on middle-end and low-end electronic devices, and simultaneously solves the problem of large heat release, high power consumption of the electronic device in the process of displaying the 3D wallpaper. At the same time, since the amount of computation in the process of rendering the graphic to be displayed is reduced, the pausing phenomenon in the process of displaying the 3D wallpaper is also effectively reduced.

In the implementation provided in the embodiment of the present application, when the 3D model is the 3D sphere model, before the step of determining the display angle of the 3D wallpaper, the method further includes the following steps A1 to A2.

A1, converting the overall spherical panoramic image into a 3D sphere map.

A2, pasting the 3D sphere map onto one 3D sphere model to obtain the 3D wallpaper.

Specifically, the panoramic image coordinate system where the overall spherical panoramic image is located can be converted into the spherical coordinate system, so that the overall spherical panoramic image can be converted into the 3D sphere map, a suitable 3D sphere model is selected according to the scale, and the converted 3D sphere map is pasted onto the 3D sphere model to obtain the 3D wallpaper.

In the implementation provided in the embodiment of the present application, when the 3D model is the skybox, before the step of determining a display angle of the 3D wallpaper containing elements, the method further includes the following steps B1 to B2.

B1, converting the overall spherical panoramic image into a cuboid map.

B2, pasting the cuboid map onto the skybox to obtain the 3D wallpaper.

Specifically, the panoramic image coordinate system where the overall spherical panoramic image is located can be converted into the three-dimensional rectangular coordinate system, so that the overall spherical panoramic image can be converted into the cuboid map, a suitable skybox is selected according to the scale, and the converted cuboid map is pasted onto the skybox to obtain the 3D wallpaper.

An embodiment of the present application further provides three specific implementations for determining a display angle of the 3D wallpaper containing elements.

In the first specific implementation, a display screen is provided on the electronic device, and the step of determining a display angle of the 3D wallpaper containing elements includes the following steps C1 to C3.

C1, acquiring a first gesture operation of the user on the display screen.

Specifically, the first gesture operation can be a click operation, a drag operation, and so on. The display screen has a function for detecting the touch of the user. The first gesture operation is acquired by the electronic device when the user performs the first gesture operation on the display screen.

C2, determining a solid angle of rotation of the 3D model corresponding to the first gesture operation.

C3, determining the rotated solid angle as the display angle of the 3D wallpaper.

When the first gesture operation of the user on the display screen is the click operation, the electronic device can detect the position where the user clicks on the display screen, determine a rotation direction of the 3D model according to a preset correspondence between the position and the rotation direction of the 3D model, and determine the solid angle of rotation according to a preset rotation rate. For example, four touch areas: upper, down, lower, and right touch areas, can be preset on the display screen. The upper, lower, left, and right touch areas correspond to the rotation directions: upward, downward, leftward, and rightward of the 3D model, respectively. At the same time, the rotation rate can be preset as rotating the 3D model 10 degrees per touch. When the user clicks on the right touch area, the 3D model can be rotated 10 degrees rightward, and the solid angle after rotation is determined as the display angle of the 3D model.

When the first gesture operation is a slide operation, the step C2 includes:

acquiring a first slide trajectory of the slide operation; determining the solid angle of rotation of the 3D model corresponding to the first slide trajectory according to a preset correspondence between the slide trajectory and the solid angle of rotation of the 3D model.

Specifically, when the user performs a slide operation on the display screen, the slide trajectory continuously changes. The correspondence between the slide trajectory and the solid angle of rotation of the 3D model can be preset. After the first slide trajectory is acquired, the solid angle of rotation is determined according to the correspondence. The solid angle after rotation is determined as the display angle of the 3D model.

For example, if the user's sliding trajectory on the screen is (1, 1), it is indicated that the slide trajectory is slid by 1 mm rightward and upward, respectively, the correspondence can be that the 3D model is rotated 1 degree rightward and upward, respectively. If the first sliding trajectory is (0, 1), (1, 2), it is indicated that the slide trajectory is slid by 1 mm rightward and then is slid by 2 mm upward again. Correspondingly, the 3D model is rotated 1 degree rightward and then 2 degree upward.

In the second specific implementation, a gyroscope is provided on the electronic device, and the step of determining a display angle of the 3D wallpaper containing elements includes the following steps D1 to D3:

D1, acquiring rotation coordinates of the gyroscope.

D2, computing a solid angle of rotation of the 3D model corresponding to the rotation coordinates.

D3, determining the solid angle after rotation as the display angle of the 3D wallpaper.

The gyroscope is provided on the electronic device. After the electronic device is moved or rotated, the gyroscope will rotate. Therefore, the correspondence between the rotation coordinates of the gyroscope and the solid angle of the rotation of the 3D model can be per-established. When the gyroscope rotates, the electronic device acquires the rotation coordinates of the gyroscope, and calculates the solid angle of the rotation of the 3D model corresponding to the acquired rotation coordinates according to the correspondence, and determines the solid angle after rotation as the display angle of the 3D wallpaper. In the present embodiment, the correspondence between the rotation coordinates of the gyroscope and the solid angle of the rotation of the 3D model can be established through an existing method, which will not be described herein again.

In the present embodiment, a gyroscope is used to determine the display angle of the 3D wallpaper. Since the gyroscope can rotate in various directions, such that the display angle of the 3D wallpaper can be a continuous range of solid angles in various directions. A user can see different graphics in various solid angles through the 3D wallpaper, which increases the user's experience.

In the third specific implementation, a gyroscope is provided on the electronic device. The step of determining a display angle of the 3D wallpaper containing elements includes:

determining a preset display angle as the display angle of the 3D wallpaper, if it is detected that the gyroscope does not rotate for a first preset duration.

The preset display angle is a display angle, which is preset, for displaying a certain particular graphic. For example, a display angle corresponding to a beautiful graphic containing all the elements in the 3D wallpaper can be determined as the preset display angle.

The first preset duration is a duration in which the gyroscope is in a non-rotation state. If the gyroscope does not rotate for the first preset duration, it is indicated that the gyroscope is in the non-rotation state for a long time, and the electronic device is not moved or rotated for a long time. At this time, the preset display angle can be determined as the display angle of the 3D wallpaper.

In other implementations, the electronic device can also detect whether the phone is in a flat state through a gyroscope. If so, the preset display angle can be determined as the display angle of the 3D wallpaper. At the preset display angle, the electronic device displays a beautiful graphic in the 3D wallpaper.

In a specific implementation provided in the embodiment of the present application, a display screen is provided on the electronic device. After the step of displaying the graphic to be displayed, the method further includes:

acquiring a second gesture operation of the user on a display area of the display screen; zooming in the display graphic in the display area.

Specifically, the second gesture operation can be a long-press operation, a heavy-press operation, and so on. If the user is interested in the viewed graphic of the 3D wallpaper and wants to watch this graphic more clearly, he or she can perform the second gesture operation on the interested display area on the display screen of the electronic device. After detecting the operation, the electronic device zooms in the display graphic in the display area, which increases the user's experience. In addition, the 3D wallpaper can also be a 3D dynamic wallpaper displaying dynamic effect for the user, which increases the user's experience.

Further, after the user finishes the second gesture operation, the electronic device can reduce the size of the display graphic which is zoomed in to the original size for display.

In other implementations, the second gesture operation can also be a long-press and drag operation. When acquiring the long-press operation of the user on the display area of the display screen, the electronic device zooms in the display graphic in the display area. Then, when detecting a drag operation, the electronic device determines a solid angle of the rotation of the 3D sphere model according to a preset correspondence between the drag and the rotation rate of the 3D sphere model to obtain the display angle of the 3D sphere model, and zooms in a graphic to be displayed corresponding to the display angle.

Figure 3:
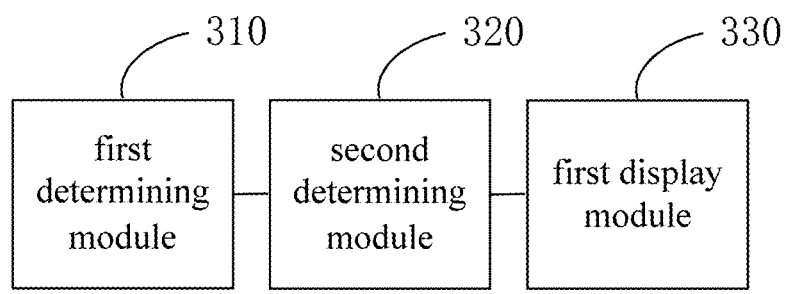
FIG. 3 is a schematic structural diagram of an apparatus for displaying an image provided by the present application.

An embodiment of the present application, which corresponds to the above method embodiment, further provides an apparatus for displaying an image, which is applied to an electronic device. FIG. 3 is a schematic structural diagram of an apparatus for displaying an image further provided by the present application. The apparatus includes:

a first determining module 310 configured to determine a display angle of a 3D wallpaper, wherein the 3D wallpaper is obtained by pasting the overall spherical panoramic image of all the elements contained in the wallpaper onto a 3D model;

a second determining module 320 configured to determine a graphic to be displayed corresponding to the display angle in the overall spherical panoramic image.

a first display module 330 configured to render the graphic to be displayed and display the rendered graphic.

For the apparatus for displaying an image provided in the embodiment of the present application, in the process of producing a 3D wallpaper containing elements, the 3D wallpaper is obtained by pasting the overall spherical panoramic image containing all the elements onto one 3D model. Since the overall spherical panoramic image is an overall spherical panoramic image of all the elements, and the overall spherical panoramic image is pasted on one 3D model, there are not occluded parts between the elements in the 3D wallpaper. Therefore, when the graphic to be displayed corresponding to the display angle of the 3D wallpaper is rendered, the operation on these unnecessary occluded parts is avoided, thereby reducing the amount of computation in displaying the 3D wallpaper and saving the computing resources.

In a specific implementation provided in the embodiment of the present application, the 3D model is a 3D sphere model or a skybox.

In a specific implementation provided in the embodiment of the present application, when the 3D model is the 3D sphere model, the apparatus further includes:

a first conversion module configured to convert the overall spherical panoramic image into a 3D sphere map; and a first pasting module configured to paste the 3D sphere map onto one 3D sphere model to obtain the 3D wallpaper.

In a specific implementation provided in the embodiment of the present application, when the 3D model is the skybox, the apparatus further includes:

a second conversion module configured to convert the overall spherical panoramic image into a cuboid map; and a second pasting module configured to paste the cuboid map onto one skybox to obtain the 3D wallpaper.

In a specific implementation provided in the embodiment of the present application, a display screen is provided on the electronic device, and the first determining module includes:

a first acquisition unit configured to acquire a first gesture operation of the user on the display screen;

a first determining unit configured to determine a solid angle of the rotation of the 3D model corresponding to the first gesture operation; and a second determining unit configured to determine the solid angle after rotation as the display angle of the 3D wallpaper.

In a specific implementation provided in the embodiment of the present application, the first gesture operation is a slide operation.

The first determining unit is specifically configured to acquire a first slide trajectory of the slide operation, and determine a solid angle of the rotation of the 3D model corresponding to the first slide trajectory according to a preset correspondence between the slide trajectory and the solid angle of the rotation of the 3D model.

In a specific implementation provided in the embodiment of the present application, a display screen is provided on the electronic device, and the apparatus further includes:

an acquiring module configured to acquire a second gesture operation of the user on a display area on the display screen; and a second display module configured to zoom in the display graphic in the display area.

In a specific implementation provided in the embodiment of the present application, a gyroscope is provided on the electronic device, and the first determining module includes:

a second acquiring unit configured to acquire rotation coordinates of the gyroscope;

a computing unit configured to compute a solid angle of the rotation of the 3D model corresponding to the rotation coordinates; and a third determining unit configured to determine the solid angle after rotation as the display angle of the 3D wallpaper.

In a specific implementation provided in the embodiment of the present application, a gyroscope is provided on the electronic device, and the first determining module is specifically configured to determine a preset display angle as the display angle of the 3D wallpaper when detecting that the gyroscope does not rotate for a first preset duration.

Figure 4:
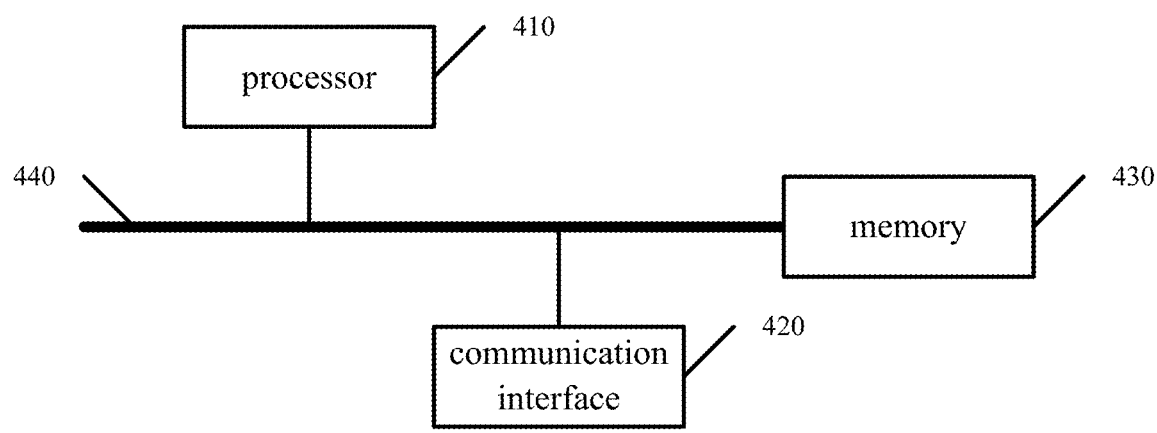
FIG. 4 is a schematic structural diagram of an electronic device provided by an embodiment of the present application.

An embodiment of the present application, corresponding to the above method embodiment, further provides an electronic device. FIG. 4 is a schematic structural diagram of an electronic device provided by the embodiment of the present application. The electronic device includes a processor 410, a communication interface 420, a memory 430 and a communication bus 440, wherein the processor 410, the communication interface 420, and the memory 430 communicate with each other via the communication bus 440.

The memory 430 is configured to store a computer program.

The processor 410 is configured to implement the method for displaying an image provided by the embodiments of the present application when executing the program stored in the memory.

Specifically, the method for displaying an image above includes:

determining a display angle of a 3D wallpaper containing elements, wherein the 3D wallpaper is obtained by pasting the overall spherical panoramic image containing all the elements onto one 3D model;

determining a graphic to be displayed corresponding to the display angle in the overall spherical panoramic image; and rendering the graphic to be displayed and displaying the rendered graphic.

For the electronic device provided in the embodiment of the present application, in the process of producing a 3D wallpaper containing elements, the 3D wallpaper is obtained by pasting the overall spherical panoramic image containing all the elements onto one 3D model. Since the overall spherical panoramic image is an overall spherical panoramic image of all the elements, and the overall spherical panoramic image is pasted on one 3D model, there are not occluded parts between the elements in the 3D wallpaper. Therefore, when the graphic to be displayed corresponding to the display angle of the 3D wallpaper is rendered, the operation on these unnecessary occluded parts is avoided, thereby reducing the amount of computation in displaying the 3D wallpaper and saving the computing resources.

In a specific implementation provided in the embodiment of the present application, a display screen is provided on the electronic device. The processor, when executing the program stored in the memory, implements the following steps:

acquiring a first gesture operation of the user on the display screen;

determining a solid angle of the rotation of the 3D model corresponding to the first gesture operation; and determining the solid angle after rotation as the display angle of the 3D wallpaper.

In a specific implementation provided in the embodiment of the present application, a gyroscope is provided on the electronic device. The processor, when executing the program stored in the memory, implements the following steps:

acquiring rotation coordinates of the gyroscope;

computing a solid angle of the rotation of the 3D model corresponding to the rotation coordinates; and determining the solid angle after rotation as the display angle of the 3D wallpaper.

Other implementations of the above method for displaying an image are the same as other implementations of the method for displaying an image provided by the foregoing method embodiment, which will be not described herein again.

The communication bus in the above electronic apparatus can be a peripheral component interconnect (PCI) bus or an extended industry standard architecture (EISA) bus and the like. The communication bus can include an address bus, a data bus, a control bus, and the like. For ease of illustration, only one thick line is shown in the figure, but it does not mean that there is only one bus or one type of bus.

The communication interface is configured to achieve the communication between the above electronic device and other devices.

The memory can include a random access memory (RAM), or can include a non-volatile memory (NVM), for example at least one disk memory. Optionally, the memory can also be at least one storage apparatus located away from the above processor.

The above processor can be a general-purpose processor, such as a central processing unit (CPU), a network processor (NP), or the like; it can also be a digital signal processor (DSP), an application specific integrated circuit (ASIC), a field-programmable gate array (FPGA) or other programmable logic apparatus, a discrete gate or transistor logic apparatus, a discrete hardware component.

An embodiment of the present application, corresponding to the above method embodiment, further provides a computer readable storage medium. The computer readable storage medium stores a computer program therein. The computer program, when being executed by a processor, causes the processor to implement the method for displaying an image provided by the embodiments of the present application.

Specifically, the method for displaying an image above includes:

determining a display angle of a 3D wallpaper containing elements, wherein the 3D wallpaper is obtained by pasting the overall spherical panoramic image containing all the elements onto one 3D model;

determining a graphic to be displayed corresponding to the display angle in the overall spherical panoramic image; and rendering the graphic to be displayed and displaying the rendered graphic.

For the computer readable storage medium provided in the embodiment of the present application, in the process of producing the 3D wallpaper containing elements, the 3D wallpaper is obtained by pasting the overall spherical panoramic image containing all the elements onto one 3D model. Since the overall spherical panoramic image is an overall spherical panoramic image of all the elements, and the overall spherical panoramic image is pasted on one 3D model, there are not occluded parts between the elements in the 3D wallpaper. Therefore, when the graphic to be displayed corresponding to the display angle of the 3D wallpaper is rendered, the operation on these unnecessary occluded parts is avoided, thereby reducing the amount of computation in displaying the 3D wallpaper and saving the computing resources.

Other implementations of the above method for displaying an image are the same as other implementations of the method for displaying an image provided by the foregoing method embodiment, which will be not described herein again.

An embodiment of the present application, corresponding to the above method embodiment, further provides a computer program product. The computer program product, when being run on a computer, causes the computer to execute the method for displaying an image provided by the embodiment of the present application.

Specifically, the method for displaying an image above includes:

determining a display angle of a 3D wallpaper containing elements, wherein the 3D wallpaper is obtained by pasting the overall spherical panoramic image containing all the elements onto one 3D model;

determining a graphic to be displayed corresponding to the display angle in the overall spherical panoramic image; and rendering the graphic to be displayed and displaying the rendered graphic.

For the computer program product provided in the embodiment of the present application, in the process of producing the 3D wallpaper containing elements, the 3D wallpaper is obtained by pasting the overall spherical panoramic image containing all the elements onto one 3D model. Since the overall spherical panoramic image is an overall spherical panoramic image of all the elements, and the overall spherical panoramic image is pasted on one 3D model, there are not occluded parts between the elements in the 3D wallpaper. Therefore, when the graphic to be displayed corresponding to the display angle of the 3D wallpaper is rendered, the operation on these unnecessary occluded parts is avoided, thereby reducing the amount of computation in displaying the 3D wallpaper and saving the computing resources.

Other implementations of the above method for displaying an image are the same as other implementations of the method for displaying an image provided by the foregoing method embodiment, which will be not described herein again.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the system is described briefly, since it is substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the protection scope of the present application.

The invention claimed is:

1. A method for displaying an image, which is applied to an electronic device, comprising:
   determining a display angle of a 3D wallpaper containing elements, wherein the 3D wallpaper is obtained by pasting an overall spherical panoramic image containing all the elements onto one 3D model;
   determining a graphic to be displayed corresponding to the display angle in the overall spherical panoramic image, wherein the display angle refers to a solid angle between the graphic to be displayed and an initial display graphic in the 3D wallpaper, and the initial display graphic is a preset graphic in the overall spherical panoramic image; and
   rendering the graphic to be displayed and displaying the rendered graphic.

2. The method of claim 1, wherein the 3D model is a 3D sphere model or a skybox.

3. The method of claim 2, wherein
   when the 3D model is the 3D sphere model, before determining a display angle of a 3D wallpaper containing elements, the method further comprises:
   converting the overall spherical panoramic image into a 3D sphere map; and
   pasting the 3D sphere map onto one 3D sphere model to obtain the 3D wallpaper; or
   when the 3D model is the skybox, before determining a display angle of a 3D wallpaper containing elements, the method further comprises:
   converting the overall spherical panoramic image into a cuboid map; and
   pasting the cuboid map onto one skybox to obtain the 3D wallpaper.

4. The method of claim 1, wherein a display screen is provided on the electronic device, and determining a display angle of a 3D wallpaper containing elements comprises:
   acquiring a first gesture operation of a user on the display screen;
   determining a solid angle of rotation of the 3D model corresponding to the first gesture operation; and
   determining a solid angle after rotation as the display angle of the 3D wallpaper.

5. The method of claim 4, wherein the first gesture operation is a slide operation; and
   determining a solid angle of rotation of the 3D model corresponding to the first gesture operation comprises:
   acquiring a first slide trajectory of the slide operation; and
   determining a solid angle of rotation of the 3D model corresponding to the first slide trajectory according to a preset correspondence between a slide trajectory and a solid angle of rotation of the 3D model.

6. The method of claim 1, wherein a display screen is provided on the electronic device; and after displaying the graphic to be displayed, the method further comprises:
   acquiring a second gesture operation of a user on a display area of the display screen;
   zooming in a display graphic in the display area.

7. The method of claim 1, wherein a gyroscope is provided on the electronic device; and determining a display angle of a 3D wallpaper containing elements comprises:
   acquiring rotation coordinates of the gyroscope;
   computing a solid angle of rotation of the 3D model corresponding to the rotation coordinates; and
   determining a solid angle after rotation as the display angle of the 3D wallpaper.

8. The method of claim 1, wherein a gyroscope is provided on the electronic device; and determining a display angle of a 3D wallpaper containing elements comprises:
   determining a preset display angle as the display angle of the 3D wallpaper when it is detected that the gyroscope does not rotate for a first preset duration.

9. An electronic device, comprising a processor, a communication interface, a memory and a communication bus, wherein the processor, the communication interface, and the memory communicate with each other via the communication bus;

the memory is used to store a computer program; and the processor is used to implement the method of claim 1 when executing the program stored in the memory.

10. The electronic device of claim 9, wherein a display screen is provided on the electronic device; and the processor is used to implement the method of claim 5 when executing the program stored in the memory.

11. The electronic device of claim 9, wherein a gyroscope is provided on the electronic device; and the processor is used to implement the method of claim 7 when executing the program stored in the memory.

12. The electronic device of claim 9, wherein the 3D model is a 3D sphere model or a skybox.

13. The electronic device of claim 12, wherein when the 3D model is the 3D sphere model, before determining a display angle of a 3D wallpaper containing elements, the processor is further caused to perform operations of:

converting the overall spherical panoramic image into a 3D sphere map; and pasting the 3D sphere map onto one 3D sphere model to obtain the 3D wallpaper; or when the 3D model is the skybox, before determining a display angle of a 3D wallpaper containing elements, the processor is further caused to perform operations of:

converting the overall spherical panoramic image into a cuboid map; and pasting the cuboid map onto one skybox to obtain the 3D wallpaper.

14. The electronic device of claim 9, wherein a display screen is provided on the electronic device, and the processor is further caused to perform operations of:

acquiring a first gesture operation of a user on the display screen;

determining a solid angle of rotation of the 3D model corresponding to the first gesture operation; and determining a solid angle after rotation as the display angle of the 3D wallpaper.

15. The electronic device of claim 9, wherein a display screen is provided on the electronic device; and after displaying the graphic to be displayed, the processor is further caused to perform operations of:

acquiring a second gesture operation of a user on a display area of the display screen; and zooming in a display graphic in the display area.

16. The electronic device of claim 9, wherein a gyroscope is provided on the electronic device; and the processor is caused to perform an operation of:

determining a preset display angle as the display angle of the 3D wallpaper when it is detected that the gyroscope does not rotate for a first preset duration.

17. A non-transitory computer readable storage medium storing a computer program therein, wherein the computer program, when being executed by a processor, causes the processor to implement the method of claim 1.

* * * * *